US007643450B2

(12) United States Patent
Marinescu et al.

(10) Patent No.: US 7,643,450 B2
(45) Date of Patent: Jan. 5, 2010

(54) UTILIZING A SAME TARGET CELL DURING CIRCUIT-SWITCHED AND PACKET SWITCHED HANDOVER

(75) Inventors: Iuliana Marinescu, Espoo (FI); Vlora Rexhepi, Espoo (FI); Rami Vaittinen, Singapore (SG); Guillaume Sebire, Espoo (FI); Kati Vainola, Hikiä (FI)

(73) Assignee: QUALCOMM Incorporated, San Diego, CA (US)

( * ) Notice: Subject to any disclaimer, the term of this patent is extended or adjusted under 35 U.S.C. 154(b) by 661 days.

(21) Appl. No.: 11/390,993

(22) Filed: Mar. 27, 2006

(65) Prior Publication Data

US 2006/0281459 A1    Dec. 14, 2006

Related U.S. Application Data

(60) Provisional application No. 60/674,726, filed on Mar. 30, 2005.

(51) Int. Cl.
*H04W 4/00*    (2009.01)
(52) U.S. Cl. .................. 370/329; 370/352; 455/436; 455/450
(58) Field of Classification Search .................. None
See application file for complete search history.

(56) References Cited

U.S. PATENT DOCUMENTS

| 6,438,370 | B1 * | 8/2002 | Einola et al. ............. 455/422.1 |
| 6,771,964 | B1 | 8/2004 | Einola et al. |
| 6,968,190 | B1 * | 11/2005 | Suumaki et al. ............. 455/436 |
| 6,990,342 | B2 * | 1/2006 | Raval et al. ................. 455/436 |
| 7,382,750 | B2 * | 6/2008 | Wu ............................. 370/331 |
| 2003/0179726 | A1 * | 9/2003 | Forssell et al. ............... 370/328 |
| 2004/0029587 | A1 | 2/2004 | Hulkkonen et al. |
| 2005/0032522 | A1 | 2/2005 | Soong et al. |
| 2005/0163106 | A1 * | 7/2005 | Vaittinen et al. ............ 370/352 |
| 2005/0272428 | A1 | 12/2005 | Tanabe et al. |

FOREIGN PATENT DOCUMENTS

| EP | 1603290 A2 | 12/2005 |
| RU | 2237381 C2 | 9/2004 |

OTHER PUBLICATIONS

3GPP TS 43.055 v6.8.0 (Jan. 2005) 3rd Geneartion Partnership Project; Technical Specification Group GSM/EDGE Radio Access Network; Dual Transfer Mode (DTM); Stage 2 (Release 6).*
Pecen et al., Simultaneous voice and data operation for GPRS/EDGE: class A dual transfer mode, Personal Communications, IEEE vol. 8, Issue 2, Apr. 2001 pp. 14-29.*
English Abstract RU 2237381 C2 with Figure 1 and 2, Rospatent.

* cited by examiner

*Primary Examiner*—Daniel J Ryman
*Assistant Examiner*—Brian Roberts
(74) *Attorney, Agent, or Firm*—Francis J. Maguire; Darren M. Simon

(57) ABSTRACT

In case of both circuit-switched and a packet-switched connection handover from a source (200) to a target (510) radio access network or base station subsystem a new target ID indication message (415.1; 415.2) is sent to a core network node (422) either from a core network element (215) or from the target radio access network or base station subsystem, depending on whether there is an interface (Gs) between the core network element and the core network node. In one embodiment, in contrast to the prior art, the new target ID indication message is mandated to only identify one target base station or target radio access network.

23 Claims, 6 Drawing Sheets

Bold lines: interfaces supporting user traffic.
Thin lines: interfaces supporting signalling.

NOTE: The Iu interface is also supported by GERAN BSS supporting Iu mode.

UTILIZING A SAME TARGET CELL DURING CIRCUIT-SWITCHED AND PACKET SWITCHED HANDOVER

CROSS-REFERENCE TO RELATED APPLICATION

This application claims priority from U.S. Provisional Patent Application No. 60/674,726 filed on Mar. 30, 2005.

BACKGROUND OF THE INVENTION

Dual Transfer Mode (DTM) is specified in 3GPP TS 43.055 V6.7.0 (2004-11), $3^{rd}$Generation Partnership Project; Technical Specification Group GSM/EDGE, Radio Access Network; Dual Transfer Mode (DTM); Stage 2 (Release 6).

Although Dual Transfer Mode (DTM) Enhancements have been standardized for GERAN A/Gb mode in 3GPP Release 6 there is a need to define improvements enabling DTM (PS+CS) handover in order to minimize the PS end-to-end delays in DTM when a delay-sensitive PS data flow is ongoing. The details of a handover of CS resources is being standardized for general handover purposes in 3GPP TS 23.009 V6.0.0 (2004-12), Technical Specification, 3rd Generation Partnership Project; Technical Specification Group Core Network; Handover procedures(Release 6). The handover of PS resources is being standardized for general purposes in the 3GPP TSG (Technical Specification Group) "GERAN" (GSM (Global System for Mobile Communication) EDGE (Enhanced Data Rates for GSM Evolution) Radio Access Network) in the technical specification 3GPP TS 43.129 v6.0.0 (2004-11), $3^{rd}$ Generation Partnership Project; Group GERAN, Packet-switched handover for GERAN A/Gb mode; Stage 2 (Release 6).

The maximum service interruption tolerable by real-time PS services is 150 ms. The interruption of the PS service introduced at handover (of the CS service) in DTM is 3.4 s in the Inter-BSC—Inter-MSC—Inter-SGSN DTM case with approximately 2.7 s induced by Routing Area Update G2-040049. An enhancement to improve the PS handover situation is shown in co-owned, co-pending U.S. provisional application Ser. No. 60/672,686 entitled "Enhancement of a Circuit-Switched (CS) handover procedure to support handover of Packet-Switched (PS) services, including a method to synchronize the handover of PS and CS resources" filed on even date herewith and which is hereby incorporated by reference for background. The invention described in the co-pending application improves PS handover and is to be proposed by the assignee hereof for adoption in TSG GERAN TS 43.129 to provide a solution to the service interruption problem for PS services upon cell change. In the disclosure thereof, the existing principles of CS and PS handover are utilized to enhance the performance of DTM in terms of end-to-end delay.

As shown in FIG. 1 hereof, TS 43.129 shows a reference architecture for PS handover in GERAN A/Gb mode including a Core Network (CN) with an MSC connected to a first SGSN via a Gs interface, the first SGSN connected to a second SGSN and to a GGSN via Gn interfaces, the MSC also connected to a PSTN with the first SGSN connected to other networks via a Gp interface, and with the GGSN connected to other networks via Go and Gi interfaces. For the radio access network, a BSS/GERAN is shown connected to the MSC of the CN via an A interface and to the first SGSN via a Gb interface. The BSS/GERAN includes a BSC connected to BTSs by Abis interfaces. One of the BTSs is shown in communication with an MS via a Um (wireless) interface. An RNS (or another BSS) is also shown with an RNC (or BSC) connected to NodeBs each having cells with Uu interfaces also capable of communicating with the MS. The NodeB is a logical node responsible for radio transmission/reception in one or more cells to/from the User Equipment. It terminates the Iub interface towards the RNC. The RNC (or BSS) is shown connected to the MSC via an IuCS interface and to the second SGSN via an IuPS interface. The figure shows both user traffic and signalling on most of these interfaces. Besides the problem solved by the above-mentioned, co-owned U.S. provisional application, there is still another problem. As presently specified, during the handover of the CS resources, the BSS initiating the handover (the "source" BSS) sends to the MSC a list of BSSs (Cell Identifier list (preferred) Information Element (IE)) from which the MSC will choose one BSS as a target BSS for handover of the CS resources. During the handover of the PS resources the BSS initiating the handover selects one Target Cell based on the received measurement reporting and sends this further to the SGSN. In the DTM handover case, the SGSN does not have any knowledge about the target BSS chosen by the MSC from the list and in some cases there may not be any direct connection between the MSC and the SGSN.

DISCLOSURE OF INVENTION

A new mechanism is provided, according to the present invention, which facilitates the handover of PS resources together with CS resources in dual transfer mode. The new mechanism is particularly applicable to an MS in DTM with an ongoing CS service and one or more active PS services.

The present invention provides a solution to the problem of synchronization of the handover of the CS and PS resources to the same target cell during a DTM handover procedure.

According to the present invention, the DTM handover procedure of the CS and PS resources is synchronized to the same target cell in the MSC and SGSN.

In order for the SGSN to initiate handover to the same cell as the one chosen by the MSC, the Target Cell Identifier IE chosen by the MSC should be known to the SGSN. The Target Cell Identifier IE is the Cell Identifier (target) IE sent by the MSC to the target BSS within the HANDOVER REQUEST message.

Depending on the information sent by the source BSS to either MSC or SGSN for the target cell ID there are two possible alternatives:

Solution 1: source BSS selects the target cell ID for the CS and PS domain based e.g. on the neighboring cell measurement reports received from the MS. In this solution, the "Cell Identifier List (preferred) IE" contains one preferred target cell. This allows the source BSS to make the coordination of a simultaneous handover for PS and CS resources. It is a preferred solution and a particular case of a general solution presented below as "Solution 2." The idea in Solution 1 is to mandate the BSS to send only one cell ID, not to leave it optional. Also, it would be advantageous to agree in the standardization process to eliminate the sending of the prior art list entirely. However, if Solution 1 cannot be agreed upon, the option of Solution 2 is available. Solution 2 also permits synchronization of the MSC and the SGSN which doesn't exist in today's specification, but doesn't mandate that the BSS send only one cell ID.

Solution 2: source BSS sends a list of Target Cell IDs in the cell ID list to the MSC for the CS domain and one target cell ID to the SGSN for the PS domain. In this case the solution depends on whether the Gs interface (MSC-SGSN interface) is supported in the core network.

If the Gs interface is supported the associated Network Mode of Operation is NMOI. If the Gs interface is not supported in the core network the associated network mode of operation is NMOII or NMOIII.

In NMOI an MS performs a combined Location Area and Routing Area (LA+RA) update procedure, while in NMOII and NMOIII the MS performs separate LA update and RA update procedures. When in Class A mode, the MS first initiates the LA update procedure and thereafter the RA update procedure.

The Target Cell Identifier should be sent from the MSC to the SGSN when NMOI is supported and from the target BSS to the SGSN when there is no Gs interface supported. Therefore, depending on the NMO mode and the support or lack of support for a Gs interface, two sub-solutions are defined:

Solution 2.1-NMO I, Gs interface is supported and the MSC sends the Target Cell ID to the SGSN via the Gs interface;

Solution 2.2-NMO II, NMO III where there is no Gs interface supported: the target BSS sends the Target Cell ID to the SGSN via the Gb interface;

These solutions are described in detail below.

These and other objects, features and advantages of the present invention will become more apparent in light of the detailed description which follows.

BEST MODE FOR CARRYING OUT THE INVENTION

Abbreviations
BSC Base Station Controller
BSS Base Station Subsystem
BTS Base Transceiver Station
CI Cell Identity
CN Core Network
CS Circuit Switched
DTM Dual Transfer Mode
EDGE Enhanced Data Rates for GSM Evolution
GGSN Gateway GPRS Support Node
GPRS General Packet Radio Service
GSM Global System for Mobile Communication
GERAN GSM EDGE Radio Access Network
IMSI International Mobile Subscriber Identity
MS Mobile Station
MSC Mobile Switching Center
NMO Network Mode of Operation
PS Packet Switched
RAI Routing Area Identity
RNC Radio Network Controller
SGSN Serving GPRS Support Node
TLLI Temporary Logical Link Identity Solution 1

Figure 1:
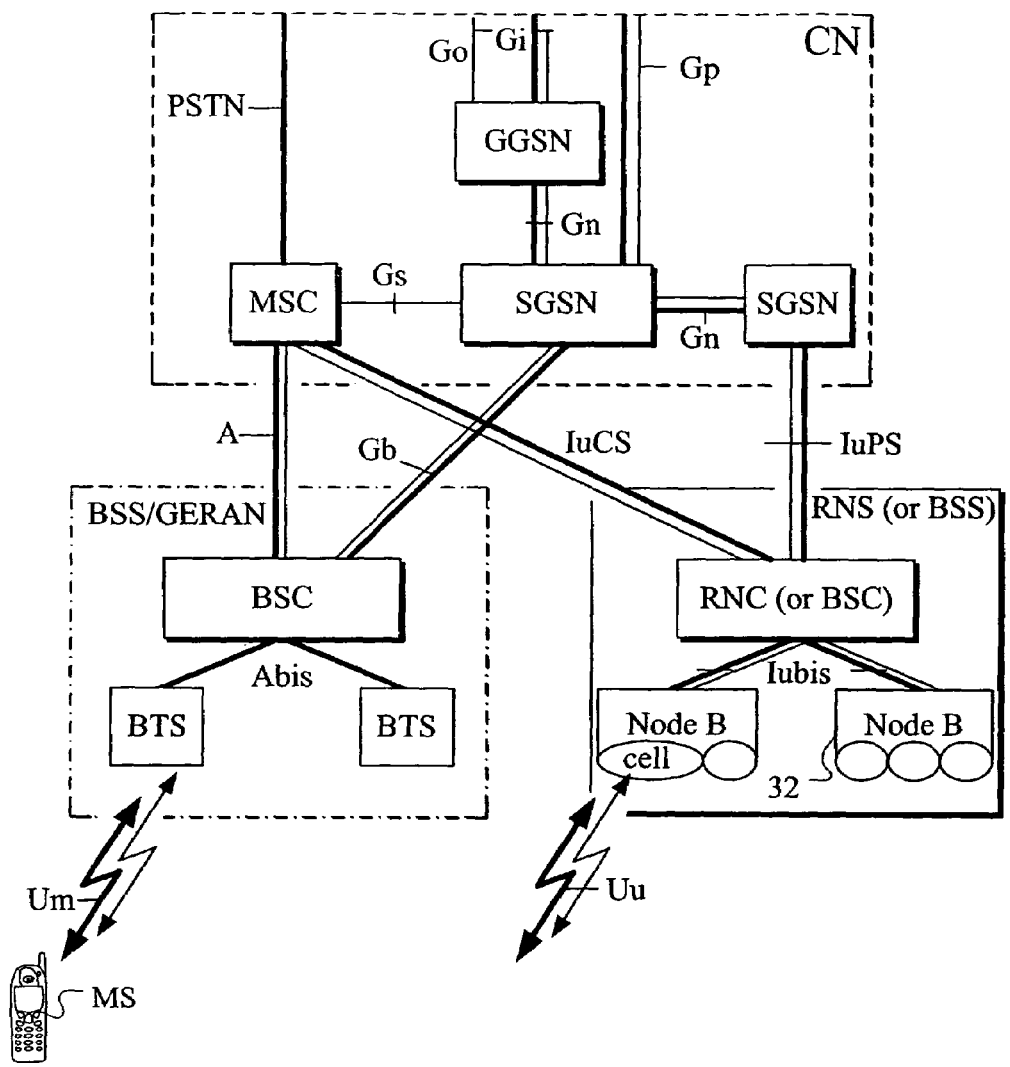
FIG. 1 shows the reference architecture for PS handover in GERAN A/Gb mode, according to the prior art.
Figure 2A:
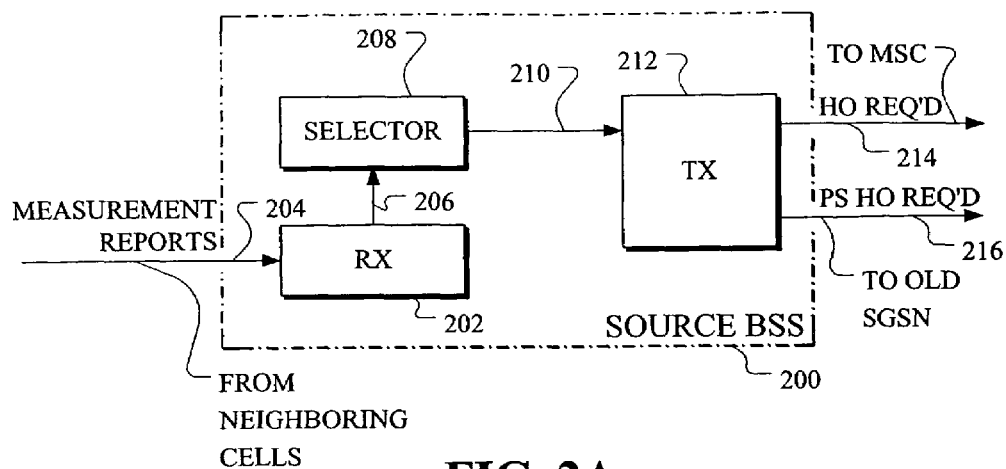
FIG. 2A shows a source BSS receiving measurement reports from neighboring cells, selecting a target BSS and sending information identifying the selected BSS to the MSC and to the old SGSN.

Referring to FIG. 2A, according to solution 1, a source BSS 200 performs the synchronization of the PS and CS handovers during DTM handover to the same target cell.

A receiver 202 is responsive to measurement report signals on a line 204 received from the MS indicative of radio conditions in neighboring cells. Such a receiver may include basic building blocks used for instance in the frequency division duplex mode of reception of the third generation system. Such a receiver might include a duplex filter connected to the antenna for providing the received signals from the neighboring cells on the line 204 and filtering same before providing filtered signals to a radio frequency receiver, which could be any kind of RF receiver such as a heterodyne receiver, a direct conversion receiver, or the like. A typical direct conversion receiver converts an RF signal to a signal centered at zero frequency. The conversion employs a quadrature down conversion, using an in-phase and quadrature-phase local oscillator to allow the signal to be recovered and sent as in-phase and quadrature output signals to a receiver baseband section which includes analog to digital conversion, pulse shape filtering and automatic gain control. The RF stage is also connected to the chip rate processing stage in which the received signal is extracted for further processing. The chip rate processing stage may also be used to control parts of the RF stage such as the automatic gain control loop and automatic frequency control. Once the received signal is recovered, the receiver 202 provides the received report signals on a line 206 to a selector 208 which selects the target cell ID for the CS and PS domain based on the neighboring cell measurement reports received from the receiver. The selector 208 may comprise a signal processor that is responsive to the received report signals on the line 206 and which processes these received report signals for the purpose of selecting the target cell ID based on pre-selected criteria. The signal processor itself may comprise software executed in coded instructions stored in a memory connected to a general purpose central processing unit by a data address and control bus and to a working memory which may be a random access memory or the like for storing intermediate results of the signal processing associated with the selection function. Such a general purpose signal processor would include an input/output device responsive to the incoming measurement reports on the line 206 and for providing the target cell ID on a line 210 to a transmitter 212. The transmitter 212 is shown as a functional block sending output signals to be described below to other network elements within a core network. Therefore, the transmitter will have the appropriate signal conditioning devices required to send electrical signals as output signals according to a protocol appropriate to the communication needed between the source BSS 200 and the other network device or devices. For instance, such could be a T1/E1 line, an ISDN line, or using some such similar communication technology and accompanying protocol used in communications between wired network elements of this kind. Most of the remaining transmitting and receiving devices shown in the subsequent disclosure hereof will comprise this sort of technology where wired communications are required. Therefore, it should be understood that although details of the transmitting and receiving functional blocks shown in remaining network elements are not shown in any particular detail, it will be realized by those of skill in the art that the underlying connection technologies will be of the sort usually employed between network elements within the core network. Furthermore, although only the receiving aspect of a source BSS 200 was described above in connection with the radio receiver 202, it will also be realized by those of skill in the art that the source BSS 200 will also include a transmitter side which is similar to the receiver side except in the reverse direction. Thus, the transmitter RF section may include chip rate processing, transmit power control, transmit baseband section and transmit RF section and finally the same duplex filter for connection to the antenna which may also be used as described above by the receive RF section. In the solution of FIG. 2A, the source BSS is mandated to send only one cell target ID information, e.g., in the Cell Identifier List (preferred) IE in the HANDOVER REQUIRED message on a line 214 to the MSC and the same target cell ID information is sent within Target Cell Id IE in the PS HANDOVER REQUIRED message on a line 216 to the old SGSN (which then forwards it to the new SGSN). In this solution, the MSC and SGSN will be mandated to choose the selected target cell ID for the handover of CS and PS resources.

Although the signal messages shown on the lines 214, 216 of FIG. 2A are shown as separate signals, it should be realized that they need not be separate and could be combined into a single signal, for instance as shown in co-owned copending U.S. provisional application Ser. No. 60/672,686 filed on even date (Mar. 30, 2005) herewith entitled "Combined Handover of Circuit-Switched (CS) and Packet-Switched (PS) resources."

Figure 3:
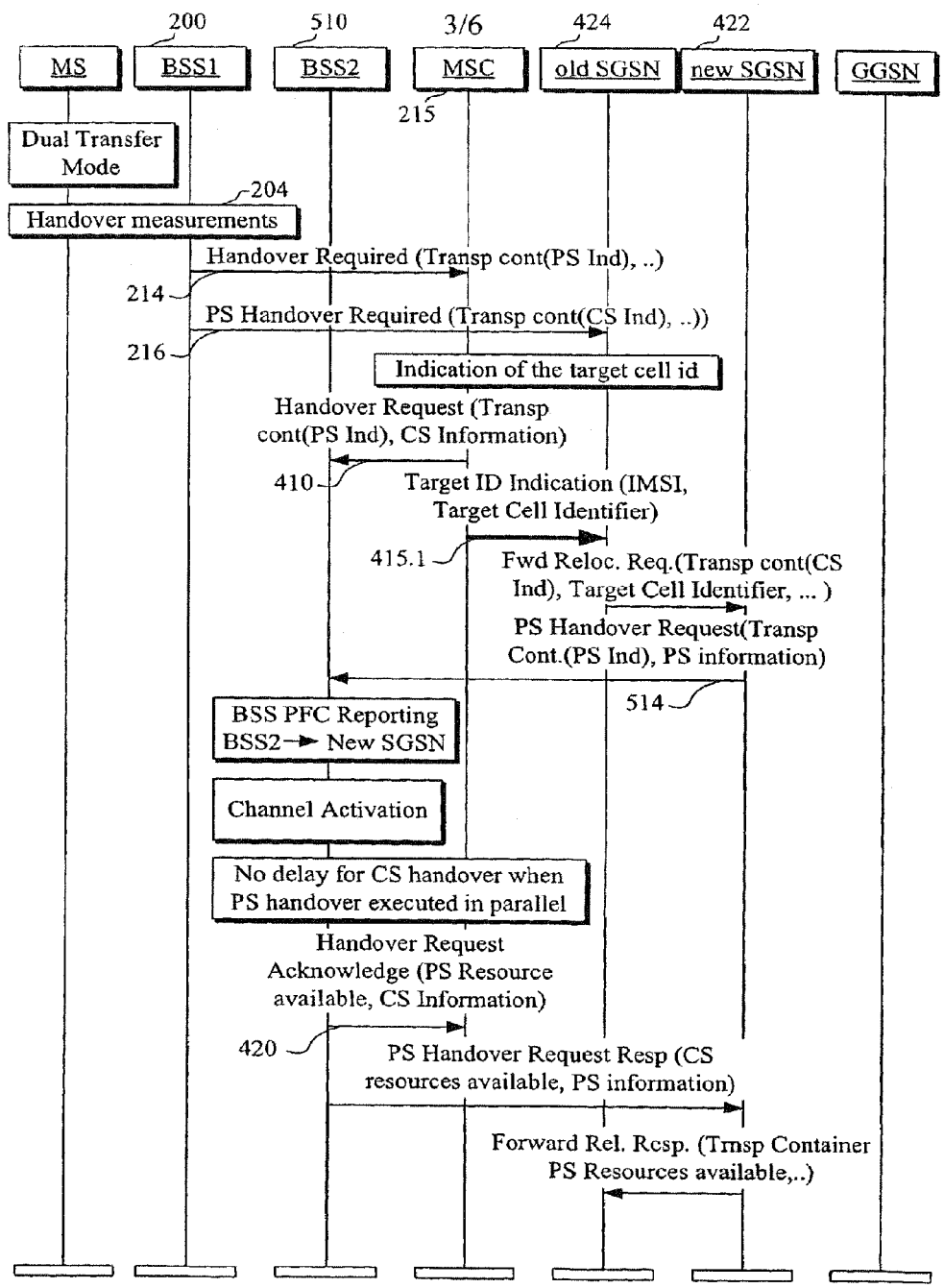
FIG. 3 presents Solution 2.1, according to the present invention, in the case of the Inter-BSS, Intra-MSC, Inter-SGSN DTM handover, NMO I, using PS Handover procedures as defined in 3GPP TS 43.129, preparation phase.

Solution 2.1—NMO I, Gs Interface Supported (FIG. 3)

In this solution, the CN performs the synchronization of the PS and CS handovers during DTM handover to the same target cell.

Figure 4:
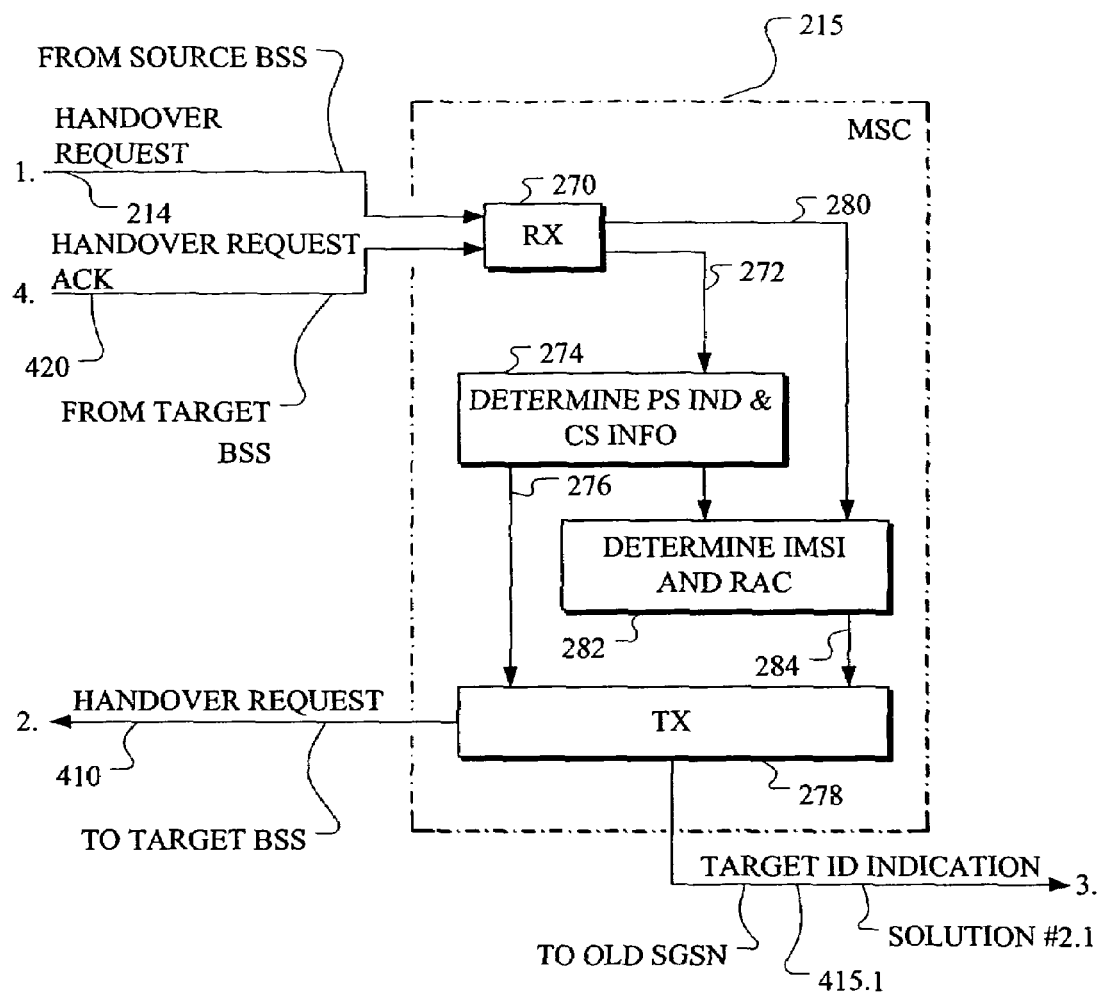
FIG. 4 shows an MSC, according to the present invention.

The first step of this new procedure is that the Routing Area Code (RAC information) is added by the source BSS within the Cell Identifier List (preferred) IE. This step may be carried out by a signal processor such as the selector 208 shown in FIG. 2A. Then this information is sent by the BSS 200 to the MSC 215 inside the HANDOVER REQUIRED message on the line 214 as shown in FIGS. 3 and 4. Upon receiving this message the MSC after it has sent a HANDOVER REQUEST message on a line 410 to a target BSS 510, informs the old SGSN about the Target Cell identifier and MS identifier (IMSI) with a new TARGET ID INDICATION message on a line 415.1 over the Gs Interface. The Target Cell Identifier may contain Cell Identity and Routing Area Code (RAC) information. Optionally, the new TARGET ID INDICATION message can be sent after the MSC has received the HANDOVER REQUEST ACKNOWLEDGE message on a line 420 from the target BSS 510, provided that this does not impact the handover performance. Target Cell Identifier IE equals the Cell Identifier (target) IE sent by the MSC to the target BSS.

Depending on how the Gs interface is implemented, during the handover in the inter-SGSN case the MSC 215 communicates either directly with a new SGSN 422 or the message TARGET ID INDICATION is sent to an old SGSN 424 and then the information is routed via Gn signalling to the new SGSN.

This new procedure is applicable also in the Inter-MSC Intra-SGSN case and the Inter-MSC Inter-SGSN cases.

Figure 5:
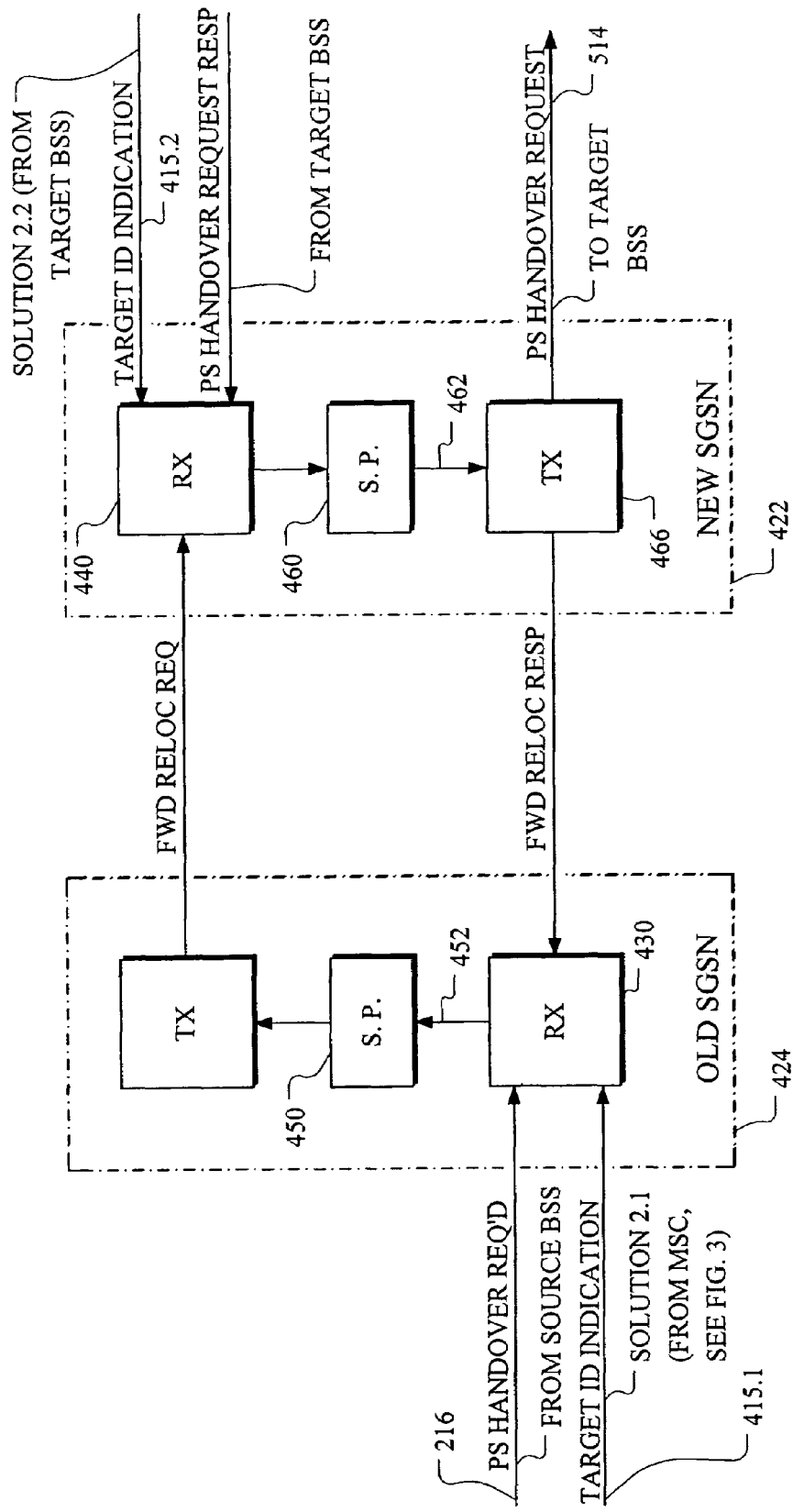
FIG. 5 shows an old SGSN in communication with a new SGSN, with the MSC of FIG. 4, and with both the source and target BSSs of FIGS. 2A and 2B, for both of the two solutions 2.1 and 2.2 disclosed, according to the present invention.
Figure 6:
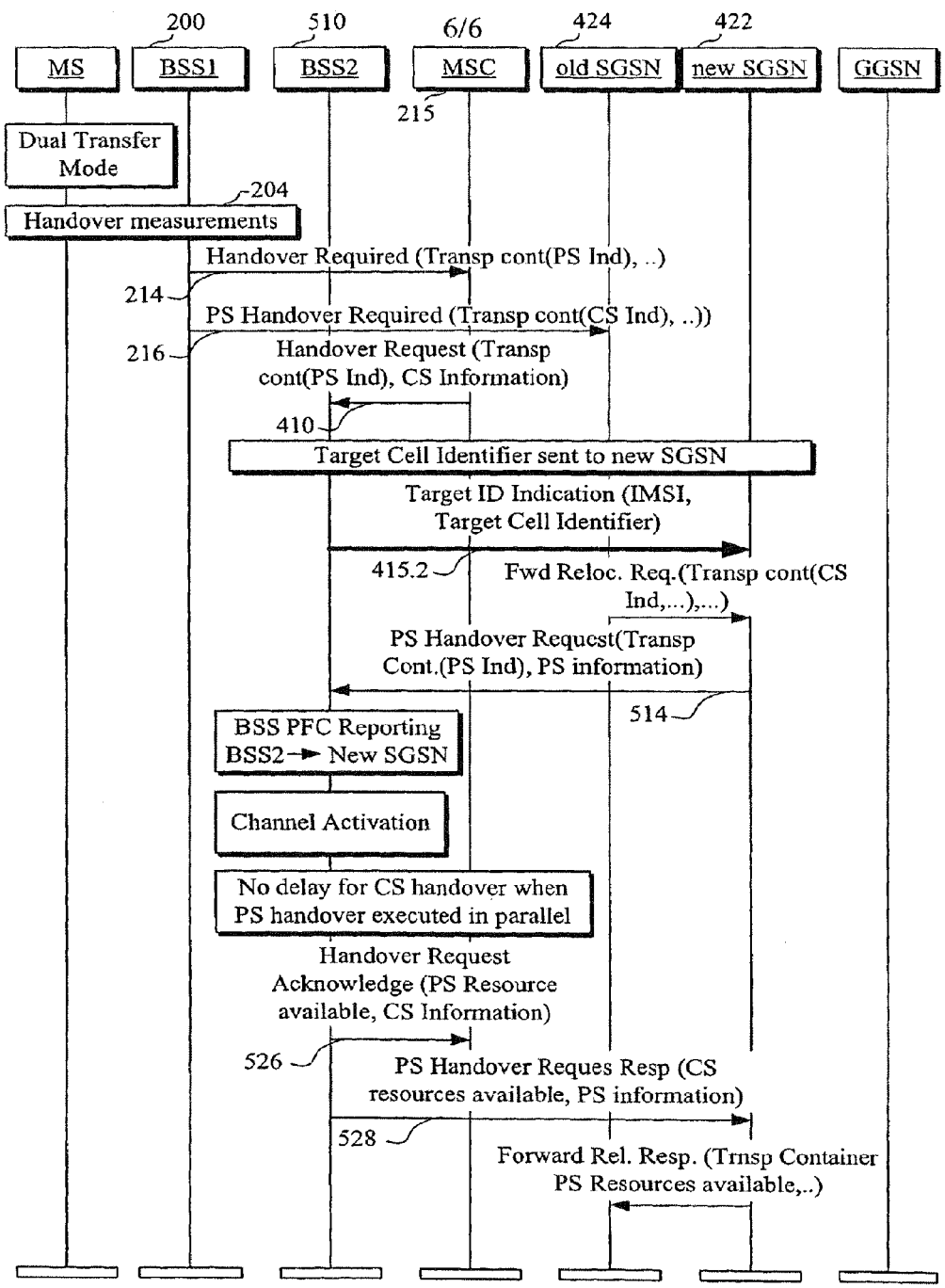
FIG. 6 presents Solution 2.2, according to the present invention, in the case of Inter-BSS, Intra-MSC, Inter-SGSN DTM Handover, NMO II, using PS Handover procedures as defined in 3GPP TS 43.129, preparation phase

FIG. 5 shows both the Solution 2.1 alternative and the Solution 2.2 alternative. In the first alternative (2.1), i.e., as also shown in FIG. 3, a receiver 430 of the old SGSN 424 receives the TARGET ID INDICATION message on a line 415.1 according to solution 2.1 from the MSC 215. In the second alternative (2.2), i.e., as shown in FIG. 6, a receiver 440 of the new SGSN 422 receives the TARGET ID INDICATION message on a line 415.2 from BSS2 510 according to solution 2.2. The receiver 430 or 440, depending on the alternative used, forwards the received message to a signal processor 450 or 460 on a line 452 or 462. In either event, upon receiving this message the signal processor 450 or 460 of the old or new SGSN, respectively, can determine the correct target BSS 510 as chosen by the MSC 215 as described below:

The signal processor of the old or new SGSN checks if the Target Cell Identifier equals the Target Cell ID, which has been received by the old SGSN from the source BSS in the PS HANDOVER REQUIRED message on the line 216 (although not shown, this may be passed on from the old to the new SGSN over the Gn interface). Once the correct Target Cell ID is chosen then the PS HANDOVER REQUEST message is sent from a transmitter 466 of the new SGSN 422 on a line 470 to the target BSS.

If the Target Cell Identifier does not equal the Target Cell ID, two options are possible for the new SGSN in order to send PS HANDOVER REQUEST message on the line 470:

Option 1: source BSS sends in the PS HANDOVER REQUIRED message on the line 216 a Target Cell ID List based on the measurement reporting. Then the new SGSN can choose the same target BSS as chosen by the MSC.

Option 2: If the new SGSN has a Gb interface with the target BSS chosen by the MSC then it can send the PS HANDOVER REQUEST message to this BSS, without considering the target Cell ID received in the PS HANDOVER REQUIRED message from the source BSS.

Solution 2.2—NMO II, No Gs Interface Supported (FIG. 6)

In case the Gs interface is not supported, it is proposed that the target BSS 510 after it has received a HANDOVER REQUEST message on the line 410 from the MSC informs the new SGSN 422 about Target Cell Identifier and MS Identifier (IMSI) by sending the new TARGET ID INDICATION message on the line 415.2 over the Gb Interface (see FIGS. 1, 2B, 5, and 6) to the new SGSN 422. The Target Cell Identifier should contain Cell Identity and Routing Area Code (RAC) information.

Upon receiving this message via the receiver 440, the signal processor 460 of the new SGSN 422 can determine the correct target BSS 510 as chosen by the MSC 215 as described below:

The signal processor 460 of the new SGSN 422 checks if the Target Cell Identifier equals the Target Cell ID, which has been received by the old SGSN from the source BSS 200 in the PS HANDOVER REQUIRED message on the line 216 (not shown but passed on to the new SGSN from the old SGSN over the Gn interface). Once the correct Target Cell ID is chosen by the signal processor 460 it provides an indication thereof on a line 462 to the transmitter 466 of the new SGSN 422 and then the PS HANDOVER REQUEST message on the line 514 is sent from the new SGSN 422 to the target BSS 510.

If the Target Cell Identifier does not equal the Target Cell ID, two options are possible for the new SGSN in order to send PS HANDOVER REQUEST message:

Option 1: source BSS sends in the PS HANDOVER REQUIRED message on the line 216 a Target Cell ID List based on the measurement reporting. Then the SGSN can choose the same target BSS as chosen by the MSC.

Option 2: If the SGSN has a Gb interface with the target BSS chosen by the MSC then it can send the PS HANDOVER REQUEST message directly to this BSS, without considering the target Cell ID received in the PS HANDOVER REQUIRED message from the source BSS.

Figure 2B:
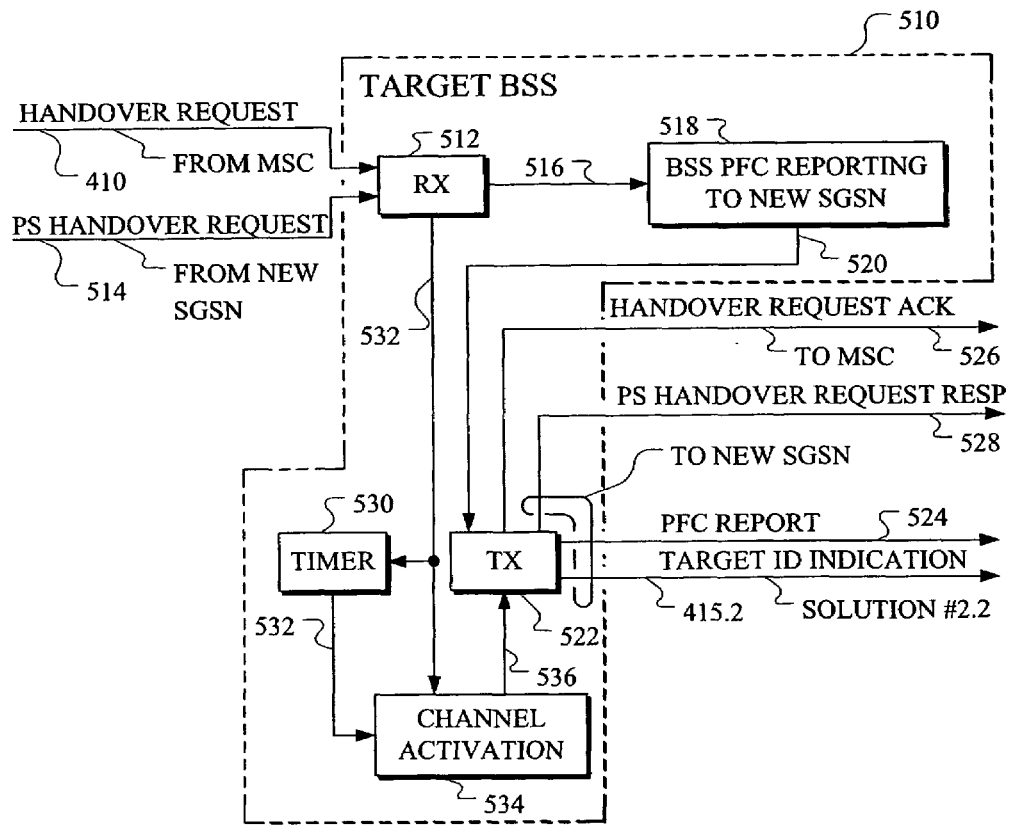
FIG. 2B shows a target BSS, according to the present invention.

FIG. 2B shows a target BSS 510 also labeled BSS 2 in FIGS. 3 and 6. As mentioned previously the target BSS 510 is responsive to the HANDOVER REQUEST signal on the line 410 from the MSC and to the PS HANDOVER REQUEST signal on the line 514 from the new SGSN. Both of these signals are received by a receiver 512 which in turn provides information contained in the information elements thereof on a line 516 to a block 518 for processing. The target BSS 510 waits for these two signals before sending the HANDOVER REQUEST ACK signal on a line 526 to the MSC and a PS HANDOVER REQUEST RESP signal on a line 528 to the new SGSN 422. There is a timer 540 provided which is started by a signal on a line 532 provided by the receiver 512 in response to receipt of the HANDOVER REQUEST message on the line 410. A certain amount of time is set by the timer 530 to wait for the PS HANDOVER REQUEST message on the line 14 which upon receipt during the given time period results in a signal provided on a line 532 to a channel activation block 534 which causes the necessary signal processing to begin for setting up the PS resources. This is indicated by a signal on a line 536 to the transmitter 522 which is responsible for sending the PS HANDOVER REQUEST RESP message on the line 528 to the new SGSN. If the timer times out and there is no PS HANDOVER REQUEST message on the line 14, then the HANDOVER REQUEST ACK message on the line 526 is sent with the information element indicating that PS resources are not available.

FIG. 4 shows an illustration of an MSC 215, according to the present invention. The HANDOVER REQUIRED message on the line 214 from the source BSS is shown being provided to a receiver 270 within the MSC 215. Information extracted from the handover required message on the line 214 is provided on a signal line 272 to a block 274 where the PS IND & CS INFO information is determined. From there, a signal is provided on a line 276 to a transmitter 278. Likewise, information on a line 280 is provided to a block 282 for determining the IMSI and RAC information which is provided on a line 284 to the transmitter 278. In response to the information provided on the lines 276 and 284, the transmitter 278 provides a HANDOVER REQUEST signal on a line 410 which is sent to the target BSS 500 of FIG. 2*b*. In the case of Solution 2.1, a TARGET ID INDICATION message is provided as well on a line 415 to the old SGSN as shown in FIGS. 3, 4 and 5. The HANDOVER REQUEST ACK message on the line 420 as shown in FIGS. 3 and 4 provides an indication to the MSC that PS resources are available as well as CS information. This is used for a purpose unrelated to the present invention to send a handover command to the source BSS and is not illustrated in any of the drawings of the present disclosure.

The invention claimed is:

1. Method, for execution by a network element of a core network of a mobile communications system comprising:

receiving a handover required message after a mobile station performs handover measurements of a radio interface between the mobile station and a source base station or a source radio access network of said system connected to said core network via said network element, said handover required message having information indicating that a handover of a circuit-switched connection and a packet-switched connection is required to a target base station or to a target radio access network connected to said core network via another network element, and sending a target identification indication message from said network element to said other network element either via said core network or via said target base station or said target radio access network.

2. The method of claim 1, wherein said handover required message only identifies one target base station or target radio access network.

3. The method of claim 1, wherein said source base station or source radio access network element is mandated to identify only one target base station or target radio access network element in said handover required message.

4. The method of claim 1, wherein said target identification indication message is sent to said other network element via said core network if there exists a direct or indirect interface between said network element and said other network element via the core network.

5. The method of claim 1, wherein said target identification indication message is sent to said other network element via said target base station or said target radio access network if there is no direct or indirect interface between said network element and said other network element via the core network.

6. Network element (215) of a core network of a mobile communications system, comprising:

a receiver, responsive to a handover required message after a mobile station performs handover measurements of a radio interface between the mobile station and a source base station or a source radio access network of said system connected to said core network via said network element, said handover required message having information indicating that a handover of a circuit-switched connection and a packet-switched connection is required to a target base station or to a target radio access network connected to said core network via another network element; and a transmitter for sending a target identification indication message from said network element to said other network element either via said core network or via said target base station or said target radio access network.

7. The network element of claim 6, wherein said handover required message only identifies one target base station or target radio access network.

8. The network element of claim 6, wherein said source base station or source radio access network element is mandated to identify only one target base station or target radio access network element in said handover required message.

9. The network element of claim 6, wherein said target identification indication message is sent to said other network element via said core network if there exists a direct or indirect interface between said network element and said other network element via the core network.

10. The network element of claim 6, wherein said target identification indication message is sent to said other network element via said target base station or said target radio access network if there is no direct or indirect interface between said network element and said other network element via the core network.

11. Method for execution by a radio access network element connected to a core network of a mobile communications system, comprising:

receiving a handover request message from a first network element of said core network with information indicating a target cell identifier for handover of both a circuit-switched connection and a packet-switched connection of a particular mobile station to said radio access network element, and sending a target identification indication message from said radio access network element to a second network element of said core network which is connected either directly or indirectly to said radio access network element but not connected either directly or indirectly to said first network element of said core network via said core network.

12. The method of claim 11, wherein said handover request message is sent by said first network element in response to a handover required message from another radio access network element that only identifies one target radio access network element.

13. The method of claim 12, wherein said other radio access network element is mandated to identify only one target radio access network element in said handover request message.

14. Radio access network element of a mobile communications system having a radio interface to a particular mobile station of said system, comprising:
    a receiver for receiving a handover request message from a first network element of a core network of said system with information indicating a target cell identifier for handover of both a circuit-switched connection and a packet-switched connection of said particular mobile station to said network element of said mobile communications system; and
    a transmitter for sending a target identification indication message from said radio access network element to a second network element of said core network which is connected either directly or indirectly to said radio access network element but not connected either directly or indirectly to said first network element of said core network via said core network.

15. The radio access network element of claim 14, wherein said handover request message is sent by said first network element in response to a handover required message from another radio access network element that only identifies one target radio access network element.

16. The radio access network element of claim 15, wherein said other radio access network element is mandated to identify only one target radio access network element in said handover request message.

17. Method for execution by a base station or radio access network element in circuit-switched communication and in packet-switched communication with a mobile station in a source cell, comprising:
    receiving measurement report signals from various cells neighboring said source cell,
    selecting one and only one target cell from among said neighboring cells for receiving a handover of said circuit-switched communication and said packet-switched communication, and
    signalling to a core network an identification signal identifying said one and only one target cell for use in identifying a target base station or target radio access network element associated with said one and only one target cell.

18. The method of claim 17, wherein said signalling is to a core network element connected to said target cell via another core network element connected to said base station or radio access network element in said source cell.

19. The method of claim 17, wherein said signalling is to a core network element connected to said target cell via said target cell.

20. Method for execution by a serving support node comprising:
    receiving a message from a source base station or radio access network indicative of a need for a handover of a packet-switched connection from a source cell served by said serving support node to a target cell served by another serving support node,
    receiving a message from a core network element having identification information concerning said target cell and a mobile station to be handed over to said target cell,
    sending a relocation request message to said other serving support node, and
    receiving a relocation request response message from said other serving support node.

21. Serving support node, comprising:
    a receiver for receiving a message from a source base station or radio access network indicative of a need for a handover of a packet-switched connection from a source cell served by said serving support node to a target cell served by another serving support node, and
    means for receiving a message from a core network element having identification information concerning said target cell and a mobile station to be handed over to said target cell,
    a transmitter for sending a relocation request message to said other serving support node, and
    means for receiving a relocation request response message from said other serving support node.

22. Method for execution by a serving support node, comprising:
    receiving a message from a target base station or radio access network in a target cell having identification information concerning said target cell and a mobile station to be handed over to said target cell from a source cell,
    receiving a relocation request message from another serving support node serving said source cell,
    sending a packet-switched handover request message to said target base station or radio access network in said target cell,
    receiving a packet-switched handover request response message from said target base station or radio access network in said target cell, and
    sending a relocation request response message to said other serving support node serving said source cell.

23. Serving support node, comprising:
    means for receiving a message from a target base station or radio access network in a target cell having identification information concerning said target cell and a mobile station to be handed over to said target cell from a source cell,
    means for receiving a relocation request message from another serving support node serving said source cell,
    means for sending a packet-switched handover request message to said target base station or radio access network in said target cell,
    means for receiving a packet-switched handover request response message from said target base station or radio access network in said target cell, and
    means for sending a relocation request response message to said other serving support node serving said source cell.

* * * * *